(12) United States Patent
Jones

(10) Patent No.: US 6,619,726 B2
(45) Date of Patent: Sep. 16, 2003

(54) RETRACTABLE AWNING FOR RECREATIONAL VEHICLE

(75) Inventor: Thomas Glenn Jones, Riverside, CA (US)

(73) Assignee: Fleetwood Enterprises, Inc., Riverside, CA (US)

( * ) Notice: Subject to any disclaimer, the term of this patent is extended or adjusted under 35 U.S.C. 154(b) by 76 days.

(21) Appl. No.: 09/761,857

(22) Filed: Jan. 17, 2001

(65) Prior Publication Data
US 2002/0092552 A1 Jul. 18, 2002

(51) Int. Cl.[7] ............................................... B60R 15/00
(52) U.S. Cl. ..................... 296/163; 296/171; 296/26.13; 160/67; 52/167; 135/88.12
(58) Field of Search .......................... 135/88.01, 88.07, 135/88.05, 88.1, 88.11, 88.12; 52/167, 73; 160/67; 296/163, 171, 26.12, 26.13

(56) References Cited

U.S. PATENT DOCUMENTS

| 5,171,056 A | * | 12/1992 | Faludy et al. ................. 135/87 |
| 5,280,687 A | * | 1/1994 | Boiteau .......................... 52/67 |
| 5,752,536 A | * | 5/1998 | Becker ....................... 135/88.1 |
| 5,860,440 A | * | 1/1999 | Murray et al. ............ 135/88.12 |
| 6,269,824 B1 | * | 8/2001 | Brutsaert ................. 135/88.12 |
| 6,276,381 B1 | * | 8/2001 | O'Brien ........................ 135/87 |

* cited by examiner

Primary Examiner—Lanna Mai

(57) ABSTRACT

A retractable awning for a recreational vehicle is provided wherein the awning is stored behind a pivoting door that closes flush with the side of the recreational vehicle when the awning is not deployed over a slide-out unit. The pivoting door is adjacent the awning and the pivoting door closes flush with the side of the recreational vehicle with the awning enclosed in its side mounted compartment. With the retractable awning completely behind the plane defining the side of the recreational vehicle and protected by a locking door, the awning does not add any additional unwanted width to the recreational vehicle and is protected from unfurling during transport. An automatic locking mechanism is provided for ensuing that the door remains closed during transportation. Further, a debris clearing mechanism is preferably installed adjacent the spool which collects the retractable awning as it retracts, thereby cleaning the awning of debris prior to its withdrawal into the compartment.

22 Claims, 5 Drawing Sheets

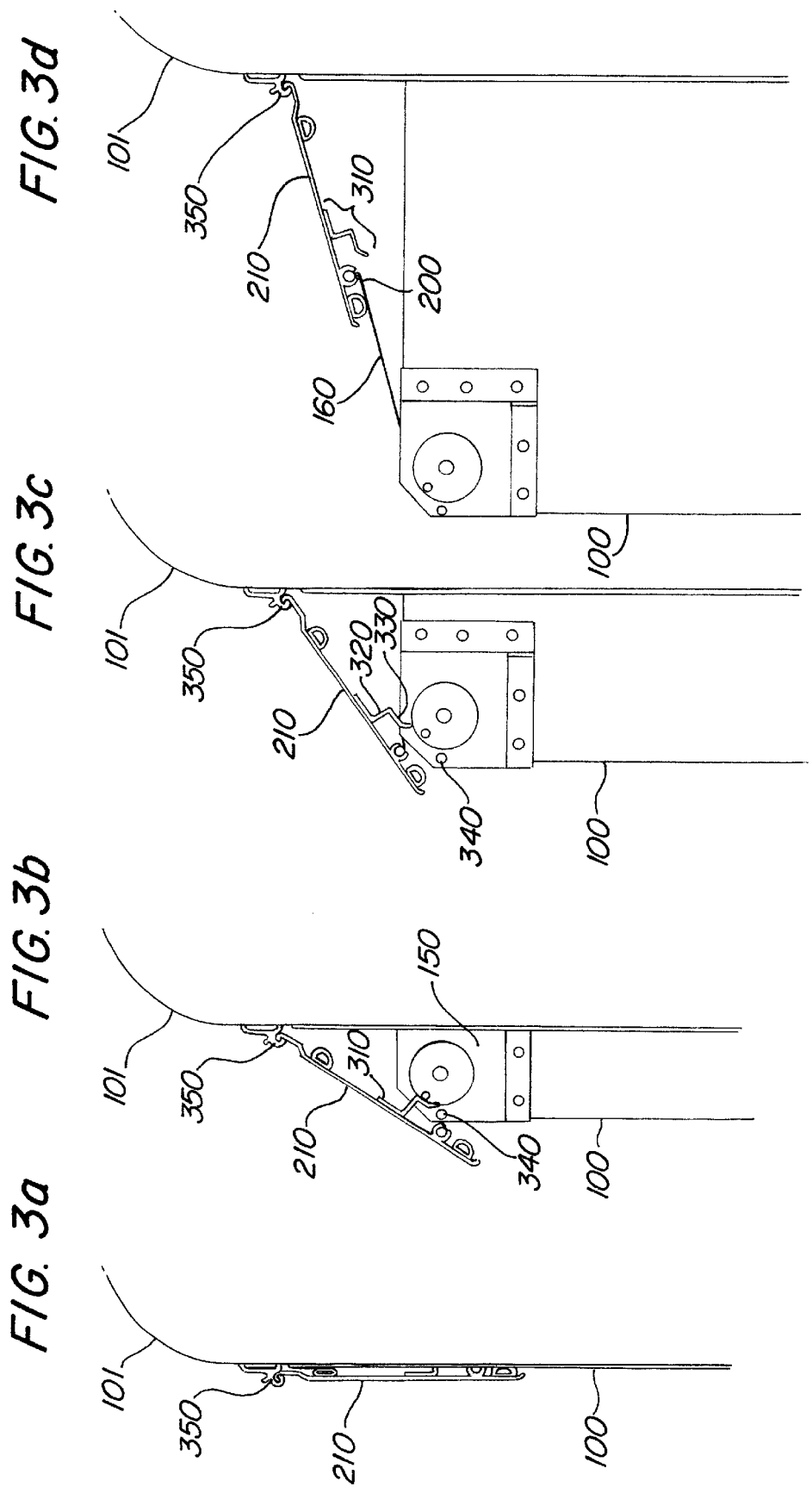

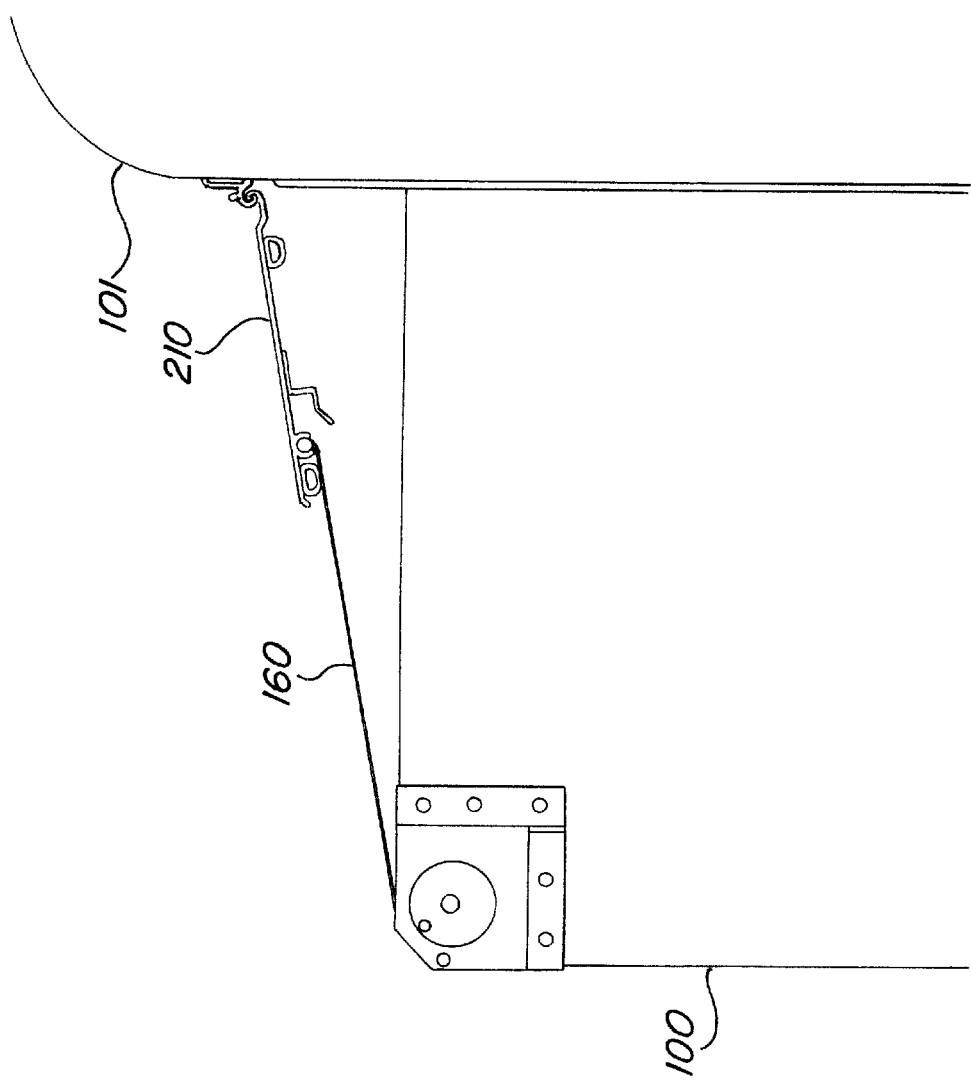

RETRACTABLE AWNING FOR RECREATIONAL VEHICLE

BACKGROUND OF THE INVENTION

1. Field of the Invention

The present invention relates generally to retractable awnings, and in particular to an awning for a recreational vehicle which is mounted on the side of the recreational vehicle and extends over a slide-out unit found in some recreational vehicles and motor homes.

2. Description of Related Art

Motor homes and recreational vehicles in particular are limited in their width in order to travel the open roads and highways. Since there are practical limitations on the length of such vehicles, the amount of space provided by these vehicles can be somewhat limited. Some manufacturers of these recreational vehicles have tried to expand the amount of room available to the traveler/owner of the recreational vehicle by providing a slide-out unit. The slide-out unit extends from a main portion of the recreational vehicle when the recreational vehicle is stationary, and is completely retracted into the recreational vehicle when the recreational vehicle is traveling. When the slide-out unit is extended from a side wall of the recreational vehicle, it forms a separate compartment perpendicular to the main compartment and increases the amount of space available to the traveler. When the slide-out unit is retracted in the recreational vehicle, the main compartment of the recreational vehicle is typically foreclosed and thus the slide-out unit is only retracted when the recreational vehicle is being driven.

Examples of a slide-out units for a recreational vehicle are those illustrated in the U.S. Pat. to Becker, No. 5,752,536 and in the U. S. Pat. to Boiteau, No. 5,280,687. As shown in each of these references, the slide-out unit includes an overhanging awning or cover that protects the upper surface of the slide-out unit. Debris such as dirt and leaves, as well as rain and snow can collect on the roof of the slide-out unit if there is no protective covering. However, the same debris etc. tends to collect on the overhanging cover, or awning and, when retracted into the recreational vehicle, may collect in the retractable awning. This debris can cause the damage to the awning, foster germs and odors, promote premature wear, and discolor the awning. Therefore, it is desirable to provide a mechanism for preventing such debris from collecting in the retracting awning as the slide-out unit is retracted into the unit.

Another problem with the prior art, as illustrated in the previously identified references, is that the awning protrudes from the side of the recreational vehicle when the slide-out unit is retracted. There is a width restriction covering vehicle bodies that measures from any non-safety feature on the side of the vehicle (side mirrors and lights do not count). The protruding awning adds additional unwanted width to the recreational vehicle for width restrictions as well as clearance purposes. The protruding awning is also subject to damage due to tree branches or obstacles if the recreational vehicle passes too closely to a tree or building.

A third difficulty with the prior art is the exposure of the awning or covering to speeds of up to sixty or seventy miles per hour. Since the awning of the prior art is located outside the vehicle during transport, there can be a tendency for the awning to unfurl while the vehicle is in motion due to the aerodynamic forces applied to he awning. Strong wind gusts can exacerbate the problem further.

SUMMARY OF THE INVENTION

The present invention solves the drawbacks of the prior art by providing an awning for a recreational vehicle behind a pivoting door that closes flush with the side of the recreational vehicle when the awning is not deployed over a slide-out unit. The retractable awning includes a metal flange that lies over a flexible canvas portion, which can be rolled on a spool at the outer edge of the slide-out unit. A pivoting door is provided over the compartment for housing the awning and the pivoting door closes flush with the side of the recreational vehicle with the awning enclosed in its side mounted compartment. With the retractable awning completely behind the plane defining the side of the recreational vehicle and protected by a locking door, the awning does not add any additional unwanted width to the recreational vehicle and is protected from unfurling during transport. An automatic locking mechanism is provided for ensuring that the door remains closed during transportation. Further, a debris clearing mechanism is preferably installed adjacent the spool which collects the retractable awning as it retracts, thereby cleaning the awning of debris prior to its withdrawal into the compartment.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein:

FIGS. 3a to 3e is a series of side views of the present invention illustrating the motion of the pivoting door and carrier.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a retractable awning for a recreational vehicle that includes a mechanism for removing debris collected on the awning, and that allows the retractable awning to be stored behind a plane defining the side of the recreational vehicle.

Figure 1:
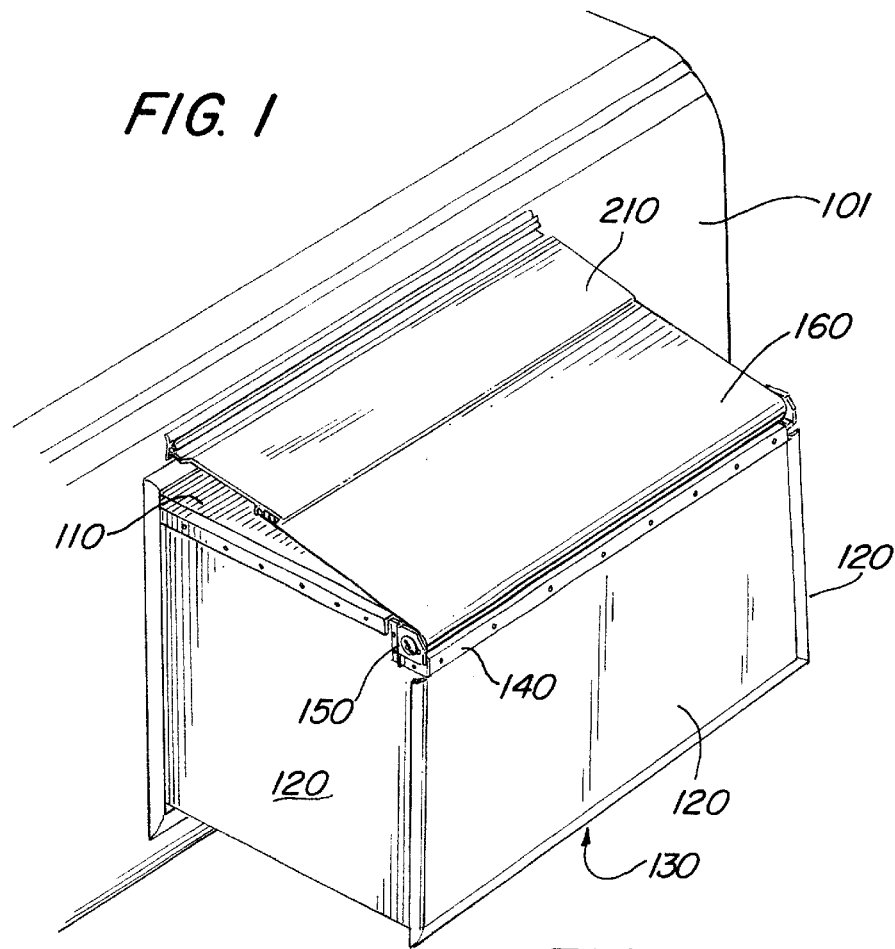
FIG. 1 is a perspective elevated view of the present invention.

FIG. 1 is a perspective view illustrating a slide-out unit 100 of a recreational vehicle 101 extended or deployed for use. The slide-out unit 100 comprises a ceiling 110 and three walls 120 and a floor 130 forming a living space, and as previously described the slide-out unit 100 can be withdrawn into the recreational vehicle 101 during transport. Attached to the upper front edge 140 of the slide-out unit 100 is a carrier for an awning 160 including a spool or roller 170 used to collect the awning 160. The roller 170 is journalled within the carrier 150 and, as will be described more fully below, collects the awning 160 as the slide-out unit 100 is retracted, and unfurls the awning 160 from the roller 170 as the slide-out unit 100 is extended from the recreational vehicle 107.

Figure 2:
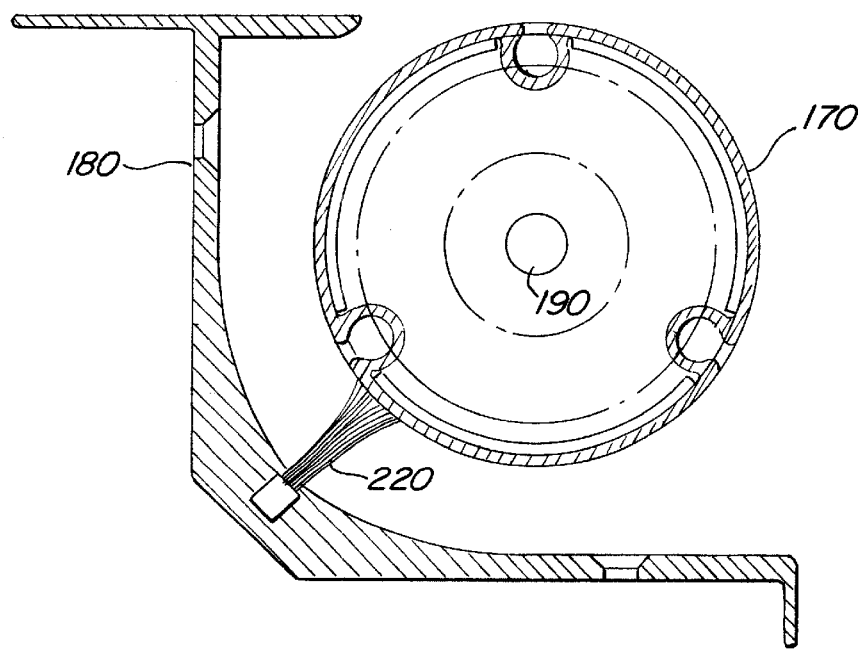
FIG. 2 is a side view in cross-section of the roller, carrier, and brush mechanism.

As shown in FIG. 2, the cross section of the carrier 150 shows a frame 180 that is mounted above the slide-out unit 100 at the upper front edge 140. The roller 170 is supported at opposite ends by a rod 190 that is journalled in side supports (not shown). Wrapped around the roller is a pliable awning 160, preferably made of vinyl or other fabric that is weather proven and durable. The roller 170 includes a torsional spring that biases the roller 170 in a direction such that tension is maintained in awning 160. One edge 195 of the awning 160 is fixed to the roller 170 and the other edge 200 of the awning 160 is secured to a pivoting door 210 on the side of the recreational vehicle 101. The torsional spring and roller combination ensures that the retractable awning 160 is taut when it is extended and rolls up tightly and compactly when retracted. FIG. 2 further illustrates a wiper brush 220 mounted on the frame 180 adjacent the roller 170 such that bristles of the brush 220 contact the portion of the awning on the roller 170. Debris such as leaves, dirt, trash, snow, water, pine needles, or the like tends to collect on the awning during the time the slide-out unit is deployed. Much of this debris will naturally fall off of the roller as the awning is collected on the roller. Some debris, however, will stick to the awning 160 and get wrapped up on the roller unless it is removed. In the present invention, the brush 220 removes debris that may have stuck to the awning for any reason and cleans the awning as it is rolled up on the roller. The brush 220 allows the awning to be free of debris in its stored condition and contributes to a longer lasting awning.

FIGS. 3a to 3e illustrate the stages of the slide-out unit from its retracted position to its deployed position. As shown in FIG. 3a, when retracted the slide-out unit is behind a plane 300 defined by the side of the recreational vehicle. A pivoting door 210 on the side of the recreational vehicle 101 overlays the side of the recreational vehicle. In other words, the retractable awning is stored behind a plane defined by the side of the recreational vehicle and no width is added to the recreational vehicle due to the retracted awning. An important feature of the present invention is the ability to maintain a door or cover adjacent the retracted awning that is substantially flush or co-planar with the side of the recreational vehicle when the slide-out unit and awning are retracted. FIG. 3b illustrates the initial stage where the slide-out unit 100 is extracted from its position within the recreational vehicle 101. The carrier 150 for the awning 160 lifts the pivoting door 210 away from the path of the carrier as the slide-out unit emerges from the recreational vehicle. As the slide-out unit 100 continues to progress as shown in FIGS. 3c and 3d, the door 210 pivots upward and rests on top of the awning 160 as the awning unfurls from the roller 170. In the fully deployed configuration as shown in FIG. 3e, the awning 160 is stretched over the top of the slide-out unit with the pivoting door 210 resting on top of the awning 160.

FIGS. 3a to 3e also illustrate a catch mechanism of the present invention that precludes the pivoting door 210 from opening in a situation other than the occurrence of the extraction of the slide-out unit 100. It is desirable to maintain the pivoting door 210 closed to prevent damage to the cover, as well as to maintain proper seal pressure on the pivoting door 210 reducing the likelihood of air or water leaks. A further benefit of the present latching mechanism is that it is automatic—it does not require any interaction from an operator to latch or unlatch the mechanism. A catch 310 is mounted on the inside surface of the pivoting door 210 comprising a perpendicular 320 and parallel 330 member defining a U-shaped catch 310 with the surface of the door as shown in FIG. 3d. As the door 210 closes behind the retracting slide-out unit, a pin 340 on the carrier 150 is captured inside of the U-shaped catch 310 as the U-shaped catch rotates about the pivot 350. As the door continues to close behind the carrier, the pin is captured by the U-shaped catch and the pivoting door is prevented from pivoting about the pivot by the pin. With the slide-out unit fully retracted, the pivoting door is secured in a closed position automatically that is without interaction from an operator. When the slide-out unit is deployed, the process is repeated in reverse with the pivoting door 210 rotating out of the way of the slide-out unit 100 and the U-shaped catch 310 rotating out of the path of the pin 340 as the carrier 150 moves laterally. In this manner, the invention provides for an automatic latching of the pivoting door 210.

Figure 4A:
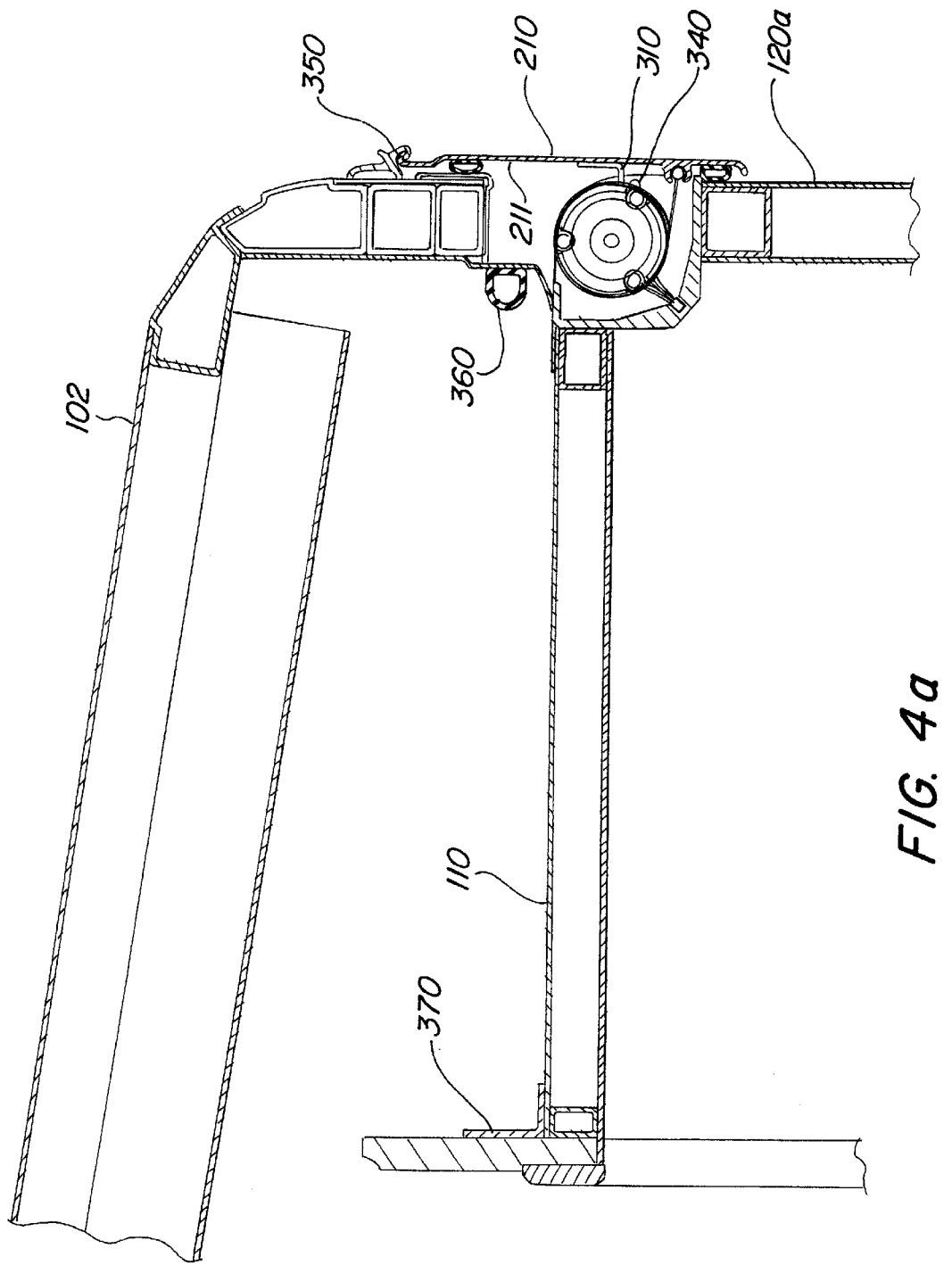
FIGS. 4a to 4b is a pair of side views in cross-section of the slide-out unit and carrier in both retracted and extended positions.
Figure 4B:
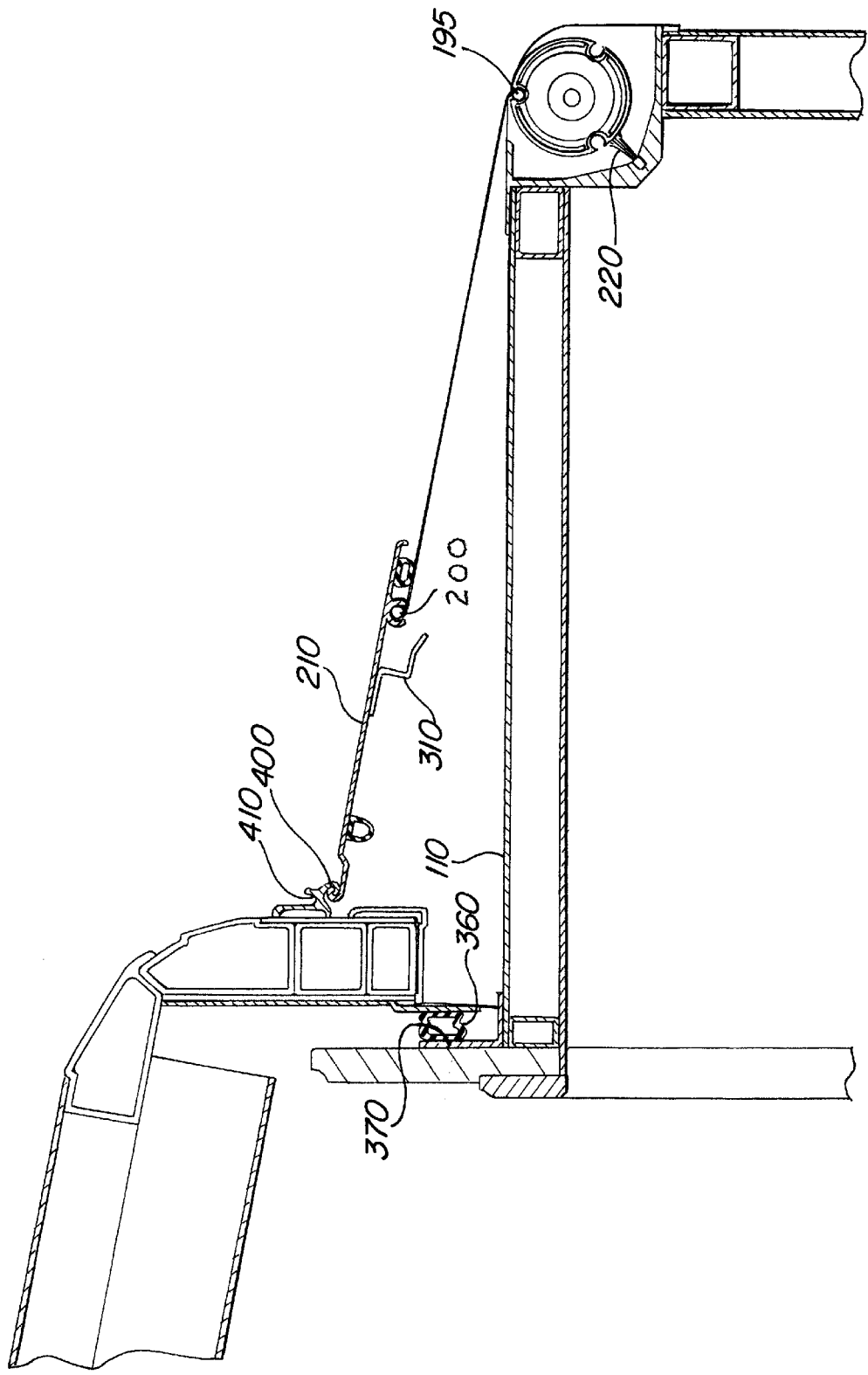

FIGS. 4a and 4b illustrate a cross section of the invention in both the fully retracted position and the fully extended or deployed position. The top 102 of the recreational vehicle is shown, and the front 120a of the slide-out unit is co-planar with the side of the recreational vehicle when the slide-out unit is retracted. As shown in FIG. 4a, the pivoting door 210 is hinged to a mount 350 located above the pivoting door on the side of the recreational vehicle. When the slide-out unit 100 is retracted, the pivoting door 210 hangs vertically and overlays the side of the recreational vehicle. On the inside surface 211 of the pivoting door 210 is the U-shaped catch 310 shown engaging the pin 340 located on the carrier 150 for the awning. On the inside of the recreational vehicle adjacent the slide-out unit is a bumper 360 for stopping the slide-out unit. The ceiling 110 of the slide-out unit includes a stop 370 that contacts the bumper 360 when the slide-out unit completes its path from retracted to extended.

The end 195 of the awning 160 is secured to the pivoting door 210 by retaining a rod 400 at the end of the awning within a shoe 410 disposed on the door 210. As the slide-out unit 100 is deployed, the awning 160 is automatically unrolled and extends from the end of the slide-out unit to the pivoting door. The combination of the pivoting door and the awning serve to shelter the slide-out unit from above when the slide out unit is completely deployed. As the slide-out unit is retracted, the tension from the torsional spring causes the awning to roll up on the roller journalled in the carrier. The brush 220 removes any debris which is not removed from the awning as the awning rotates on the roller.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An awning system for use in connection with a slide-out unit of a recreational vehicle comprising:
   a flexible awning mounted on a roller within a carrier attached to a top portion of the slide-out unit, the roller adapted to wind the flexible awning thereon as the carrier is retracted and unfurl the awning as the carrier is extended from the recreational vehicle;
   wherein the carrier and roller with the wound flexible awning are disposed behind a plane defined by a side of the recreational vehicle when the slide-out unit is retracted in the recreational vehicle.

2. The awning system of claim 1 further comprising a door mounted on the recreational vehicle above the slide-out unit for protecting the flexible awning when the carrier is in the retracted position.

3. The awning system of claim 2 wherein said door pivots away from a side of the recreational vehicle when the carrier is extended, and hangs downward adjacent the carrier when the carrier is retracted inside the recreational vehicle.

4. The awning system of claim 3 further comprising a locking mechanism for automatically securing the pivoting door to the carrier when the carrier is retracted within the recreational vehicle.

5. The awning system of claim 4 wherein the pivoting door traps a pin on the carrier as the carrier retracts into the recreational vehicle, thereby securing the pivoting door to the carrier.

6. The awning system of claim 1 further comprising a brushing mechanism in contact with the flexible awning to remove debris prior to the flexible awning winding on the roller.

7. In a recreational vehicle, the improvement comprising an awning system for a slide-out unit wherein the awning system comprises:
 a flexible awning mounted on a roller within a carrier, the carrier forms a top edge of the slide-out unit, the roller adapted to wind the flexible awning thereon as the carrier is retracted and unfurl the awning as the carrier is extended from the recreational vehicle to cover the top of the slide-out unit;
 wherein the carrier and roller with the wound flexible awning are disposed behind a plane defined by a side of the recreational vehicle when the carrier is retracted in the recreational vehicle.

8. The awning system of claim 7 further comprising a door mounted on the recreational vehicle above the slide-out unit for protecting the flexible covering when the carrier is in the retracted position.

9. The awning system of claim 8 wherein said door pivots away from a side of the recreational vehicle when the carrier is extended, and hangs downward adjacent the carrier when the carrier is retracted inside the recreational vehicle.

10. The awning system of claim 9 further comprising a locking mechanism for automatically securing the pivoting door to the carrier when the carrier is retracted within the recreational vehicle.

11. The awning system of claim 10 wherein the pivoting door traps a pin on the carrier as the carrier retracts into the recreational vehicle, thereby securing the pivoting door to the carrier.

12. The awning system of claim 7 further comprising a brushing mechanism positioned below the roller and in contact with the flexible awning to remove debris prior to the flexible awning winding on the roller.

13. In a vehicle with a slide-out unit, the improvement comprising:
 a door pivotably mounted on the vehicle;
 a flexible covering mounted on a roller within a carrier, the roller adapted to wind the flexible covering thereon as the carrier is retracted and unfurl the covering as the carrier is extended from the vehicle;
 wherein the carrier is disposed behind a plane defined by a side of the vehicle when the carrier is retracted in the vehicle, and the door pivots away from the vehicle when the carrier is extended, and hangs downward adjacent the carrier when the carrier is retracted inside the vehicle for protecting the flexible covering when the carrier is in the retracted position.

14. The invention of claim 13 further comprising a locking mechanism for automatically securing the door to the carrier when the carrier is retracted within the vehicle.

15. The invention of claim 14 wherein the door traps a pin on the carrier as the carrier retracts into the vehicle, thereby securing the door to the carrier.

16. The invention of claim 13 further comprising a brushing mechanism in contact with the flexible covering to remove debris prior to the flexible awning winding on the roller.

17. A retractable awning assembly for a vehicle comprising:
 a member adapted to extend outward from the vehicle and to retract within the vehicle;
 a roller operatively mounted on the member;
 a flexible awning connected at one end to the roller and adapted to be operatively held at the other end adjacent the vehicle, the roller is adapted to wind the flexible awning thereon as the member is retracted and unfurl the flexible awning as the member is extended; and
 a movable door adapted to be operatively mounted on the vehicle to extend away from the vehicle when the member is extended and to hang downward adjacent the member when the member is retracted within the vehicle for protecting the flexible awning when the member is in a retracted position.

18. The retractable awning assembly of claim 17 wherein the flexible awning is connected at the other end to the movable door.

19. The retractable awning assembly of claim 17 wherein the outward movement of the member pivots the movable door to extend away and the retracting movement of the member causes the door to retract to a position downward adjacent the member.

20. The retractable awning assembly of claim 17 including a brushing mechanism mounted on the member and beneath the roller to contact with the flexible awning to remove debris as the flexible awning winds on the roller.

21. An improved vehicle having a slide-out unit comprising:
 a vehicle body with a side wall moveably mounting the slide-out unit;
 a roller operatively mounted on the slide-out unit;
 a flexible awning connected to one end to the roller and operatively mounted to the other end to the vehicle at a position above a connection of the slide-out unit and the vehicle, the roller winds the flexible awning thereon as the slide-out unit is retracted to be co-planar with a side of the vehicle for storage and unfurls the flexible awning as the slide-out unit is extended from the vehicle to cover an extended top portion of the slide-out unit; and
 a movable door mounted on the side wall above the slide-out unit; the movable door extends outward from the side wall when the slide-out unit is extended and lies parallel to the side wall to cover a top edge of the slide-out unit when the slide-out unit is retracted within the vehicle and protects the flexible awning when wound in a storage position.

22. The improved vehicle of claim 21 further including a locking mechanism for locking the movable door when the slide-out unit is retracted within the vehicle.

* * * * *